Dec. 20, 1949 W. L. LISTER 2,491,671
COMBINED SEAT AND ARTICLE-RECEIVING CHAMBER
Filed July 2, 1945
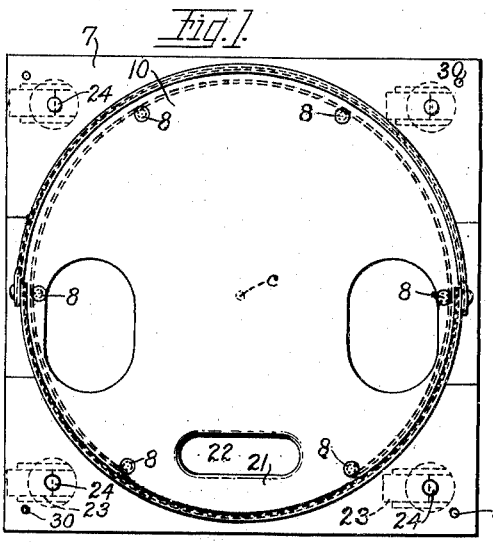
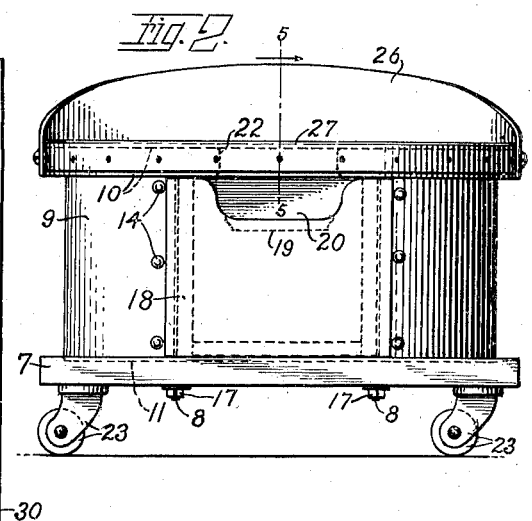
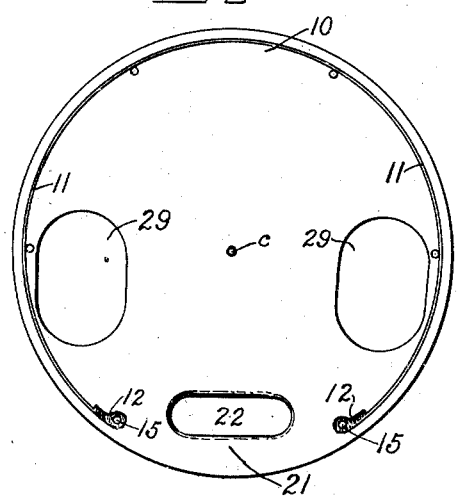
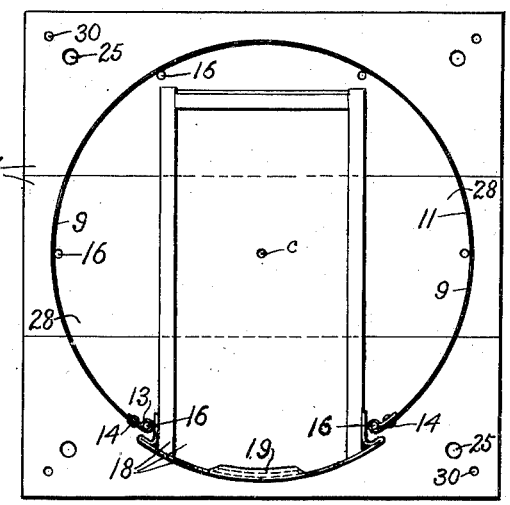
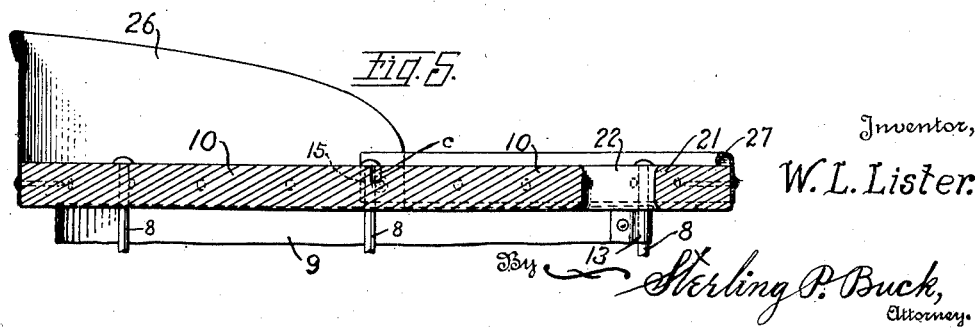
Inventor,
W. L. Lister.
By Sterling P. Buck,
Attorney.

Patented Dec. 20, 1949

2,491,671

UNITED STATES PATENT OFFICE 2,491,671

COMBINED SEAT AND ARTICLE-RECEIVING CHAMBER

Warren L. Lister, Chickasha, Okla.

Application July 2, 1945, Serial No. 602,887

3 Claims. (Cl. 155—2)

1

This invention relates to a combined seat and article-receiving chamber; and though it is intended to be especially useful and convenient for any person who is repairing or adjusting or investigating the lower parts of an automobile or motor-vehicle, it is also applicable and convenient to be used in connection with many other jobs in homes and factories, shops, etc.

One object of the invention is to provide a seat that is so low that a person sitting on it can reach low parts more easily and comfortably than if sitting or kneeling on the ground or surface on which the automobile or other machine rests.

Another object is to provide such stool or seat with a base-plate that serves not only as a secure foundation and anchorage for the elements superposed thereon, but also is a secure anchorage for four castors that are so widely spaced from one another that they preclude over-turning or tilting of the device when the mechanic or other occupant leans in any direction while seated thereon.

Another object is to provide a seating surface that is provided with a seat-back that is so low that it permits the occupant to lean far back with but little or negligible discomfort or interference, but which is high enough to aid the occupant in trundling the device rearward while being seated on the seating surface or on a cushion (not shown) that is then seated on the seating surface.

Another object is to provide the seat-surface with a bead that extends along the left-front, front and right-front; that is only a minor fraction of an inch high, viz., less than a half-inch; and that adjoins the right-rear and left-rear ends of the seat-back where the forward inclines of the latter terminate in portions only a little higher than the bead; thereby serving as means to abut against the pants-seat of a person who occupies the seat-surface and is moving forward so as to trundle the device forward; or serving as means to trundle the device rightward or leftward by moving his pants-seat rightward or leftward.

Another object is to provide in very convenient position to the hands of the occupant, a tool-drawer or receptacle for wrenches, screwdrivers, and other hand-tools, nuts, bolts, etc., so as to save time in seeking such necessary articles that may be scattered around.

A further object is to provide, in a device of this type, compartments at opposite sides of the tool-drawer, wherein can be placed an electric battery and a light bulb, which latter, when properly charged and interconnected, can be brought out thru a hand-hole and supported in various positions by appropriate means (not shown) that

2 may be seated in any elected one of the openings provided therefor adjacent to the four corners of the base-plate.

Another object is to provide, with the minimum number of previously separate parts, a device of this type that is exceedingly useful and convenient and comfortable to the occupants; capable of being easily trundled in all horizontal directions; and provided with a carrying handle that is properly positioned to prevent the contents of its drawer and other compartments being spilled when carried by said handle.

Other objects and important features are pointed out or implied in the following details of description, in connection with the accompanying drawings in which:

Fig. 1 is a top plan view of the device that constitutes one form of my invention.

Fig. 2 is a front elevation of the device seen in Fig. 1.

Fig. 3 is a bottom plan or under-side view of the seat-plate per se.

Fig. 4 is a top plan view of the base-plate the arcuate wall and the drawer, the latter positioned slightly forward of its normal closed position.

Fig. 5 is an enlarged sectional detail view taken along the line 5—5 of Fig. 2.

Referring to these drawings in detail, similar reference numerals refer to similar parts in the several views and are referred to in the following explanation and description, as follows:

Though the device may be composed of any appropriate material or materials, the present embodiment may be considered as made of readily available and comparatively low-cost wooden boards and sheet metal secured together by ordinary commercial nails, bolts and rivets; and as many kinds of wooden boards are likely to warp, and as extra-broad boards are usually expensive and not always available, I have indicated the base-plate as being composed of three relatively narrow boards that are matched and joined edge-to-edge; and it is unnecessary that these boards be doweled or glued together, because of the securing means inherent in the securing bolts 8 and their respective nuts, in combination with the arcuate wall 9 and the seating plate or seat-board 10; these being interengaged in the mutual relation now explained:

With any appropriate kind of circular or arcuate scoring tool (not shown) pivoted at the center $c$ and carrying a rotary or fixed scoring bit at a proper distance from said center, the arcuate scores 11 can be formed in the upper side of the base-plate 7 and lower side of the seat-board 10 to depths of about $\frac{1}{16}''$ to $\frac{1}{8}''$, according to the hardness of the wood or other material in which these scores are made; and, at the ends of these scores, a hand gouge may be used to widen the scores as seen at 12 to provide cavities for the respective looped ends of the sheet metal wall 9 to be seated in. The loops 13 may be made permanent and strong by use of rivets 14 or other appropriate means, for the sheet metal is desirably relatively thin and light-weight, for instance, 28 to 32 gage galvanized or enameled sheet iron or steel.

The loops respectively surround front rods 8 that extend thru bolt-holes 15 in the seat-board or plate 10 and thru bolt-holes 16 in the baseplate 7, while the intermediate and rear parts of the wall 9 extend around and substantially against the rods 8 that are intermediately and rearwardly disposed; so the rods 8 and scores combine with the nuts 17 (Fig. 2) for serving as securing means to rigidly and fixedly unite the base-plate the seat-plate and the arcuate wall so as to form storage receptacles whose top is a substantially circular seating surface of any appropriate size. The looped ends 13 are spaced about 6½ inches from one another to provide a passage or entrance for permitting a drawer 18 to be seated on the base-plate and be pulled forward and pushed rearward. The front-upper part of the drawer, as here shown, is of sheet metal and is turned inward and downward at 19 to provide a handle and to provide a hand-hole 20, so the user can have free access therethru to the carrying handle 21 which latter is an element of the seat-plate 10, provided by cutting the hand-hole 22 near the front edge of the seat-plate 10; so, when desirable to carry the stool or mechanic's low chair from place to place, it can be lifted and carried by this handle 21 without possibility of spilling the drawer or any other contents of the hollow structure or combination.

However: Each user has the preference of carrying or trundling the combination from place to place, for it is provided with castors 23 whose shanks 24 are fitted in bores 25 (Fig. 4); so the device can be pulled by use of a rope or cord or strap thru the openings 20 and 22; or can be trundled by the occupant of the seat while seated thereon. The seat-back 26 and front bead 27 aid the occupant in trundling the device to various positions, in the manner explained in the foregoing.

Spaces or chambers 28 are provided at opposite sides of the drawer 18, for containing articles of various kinds to be used by occupants of the seat-plate; especially for containing an electric battery, light-bulb and circuit-wires, etc.; so to gain ready access to the contents of these chambers 28, hand-holes 29 are provided, so the user can reach thru these hand-holes for (bringing out the contents) without rising from the seat-plate, but merely leaning to right or left so as to uncover the opening 29 to be used. If a flexible cushion is used on the seatplate 10, it may be designed to have openings that communicate with those of the seat-plate 10, or may be only wide enough to cover the inner edges of the openings and the surface therebetween.

Holes or sockets 30 are provided near the corners of the base-plate to receive a shank or lower end portion of an upright support for an electric light (not shown).

The seat-back 26, beaded strip 27, and the nails or other fasteners that secure them to the periphery of the seat-plate 10, cooperate with the elements 7, 8 and 9 to prevent detrimental warping of the seat-plate while also reinforcing the latter against splitting or cracking; and in a reciprocal manner, the elements 8, 9, 10, 17 mutually contribute to prevent the base-plate from warping or cracking or detrimentally separating at the joints where the several boards are joined edge-to-edge. Therefore, this mechanic's seat is exceedingly strong, rigid, durable and generally practical; while being composed of relatively few, simple and low-cost primarily separate parts than can be assembled and united by any physically able person of little mechanical skill and training.

I claim the following as my invention:

1. In a combined seat and article-receiving chamber, the combination of a base-plate provided with a series of openings at points spaced from one another in an arcuate line, an arcuate wall having its lower edge seated on said base-plate and extending along an arcuate line around and adjoining said openings, a seat-plate having a portion seated on the upper edge of said arcuate wall, a series of securing rods extending thru the said openings of said base-plate and seat-plate at positions substantially against the inner surface of said wall, the ends or upright edges of said wall being spaced from one another and secured to two of said rods so as to provide an entrance to said chamber; and means cooperative with said rods so as to fixedly secure said wall to said base-plate and seat-plate.

2. In the combination defined by claim 1, the base-plate being provided with an arcuate groove or score in which the lower edge of said wall is seated, said seat-plate being provided with an arcuate groove or score in which the upper edge of the arcuate wall is seated.

3. In combination, a base-plate, an arcuate wall on the base-plate in a proper relation to provide a drawer-passage at its front part, a seat-plate on the upper edge of said arcuate wall, means to rigidly unite said base-plate and wall and seat-plate, a drawer normally on said base-plate in a proper position to be passed inward and outward thru said drawer-passage, said drawer being considerably narrower than the distance between opposite rightwardly and leftwardly bulged sides of said wall so there are chambers provided at opposite sides of the drawer for containing articles, said seat-plate being provided with hand-holes above the respective chambers for permitting the user's hands to pass therethru for removing and replacing articles with respect to said chambers.

WARREN L. LISTER.

REFERENCES CITED

The following references are of record in the file of this patent:

UNITED STATES PATENTS

| Number | Name | Date |
|---|---|---|
| 245,833 | Imse | Aug. 16, 1881 |
| 254,867 | Graham et al. | Mar. 14, 1882 |
| 1,408,253 | Blank | Feb. 28, 1922 |
| 1,457,567 | Denny et al. | June 5, 1923 |
| 1,976,170 | Hoover et al. | Oct. 9, 1934 |
| 2,121,511 | Schlessinger | June 21, 1938 |

FOREIGN PATENTS

| Number | Country | Date |
|---|---|---|
| 223,744 | Great Britain | Oct. 30, 1924 |
| 362,514 | Germany | Oct. 28, 1922 |
| 478,635 | Germany | June 29, 1929 |